No. 746,530. PATENTED DEC. 8, 1903.
W. J. LATCHFORD.
MACHINE FOR PREPARING FRUIT FOR CANNING.
APPLICATION FILED JAN. 20, 1903.
NO MODEL. 3 SHEETS—SHEET 1.
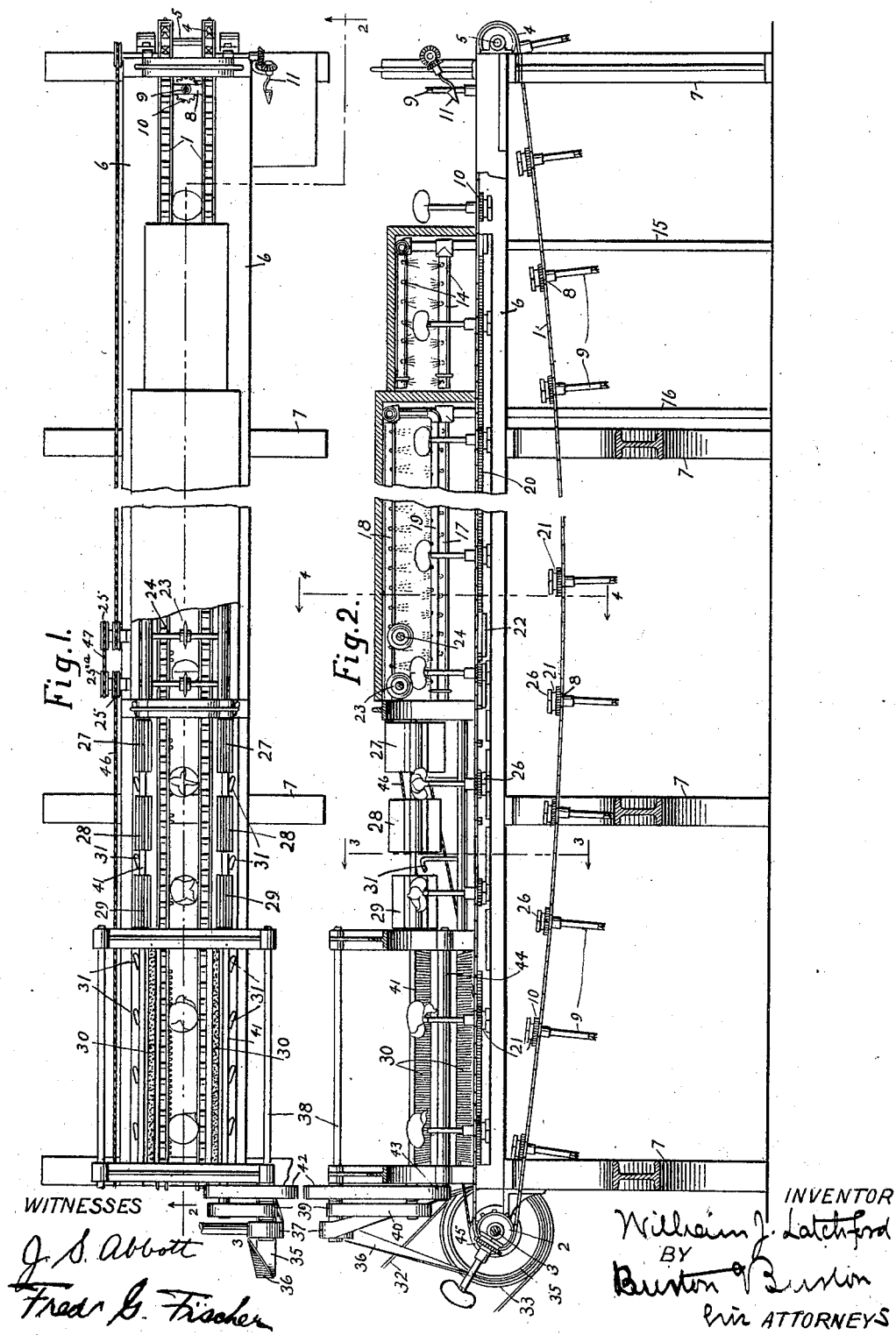
WITNESSES
J. S. Abbott
Fred G. Fischer
INVENTOR
William J. Latchford
BY
Burton & Burton
his ATTORNEYS No. 746,530. PATENTED DEC. 8, 1903.
W. J. LATCHFORD.
MACHINE FOR PREPARING FRUIT FOR CANNING.
APPLICATION FILED JAN. 20, 1903.
NO MODEL. 3 SHEETS—SHEET 2.
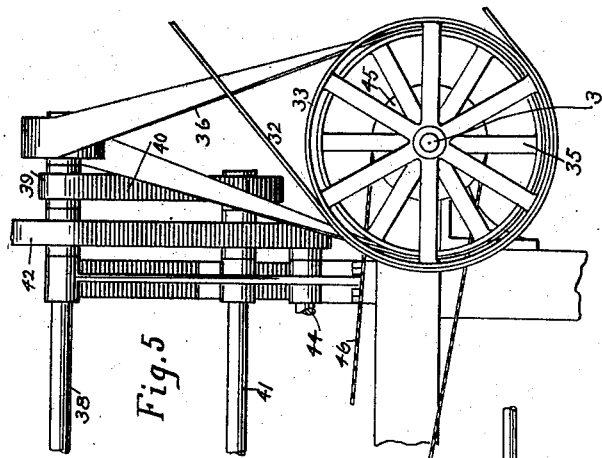
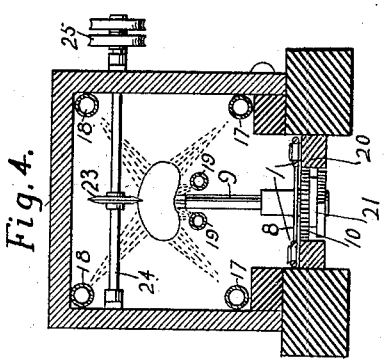
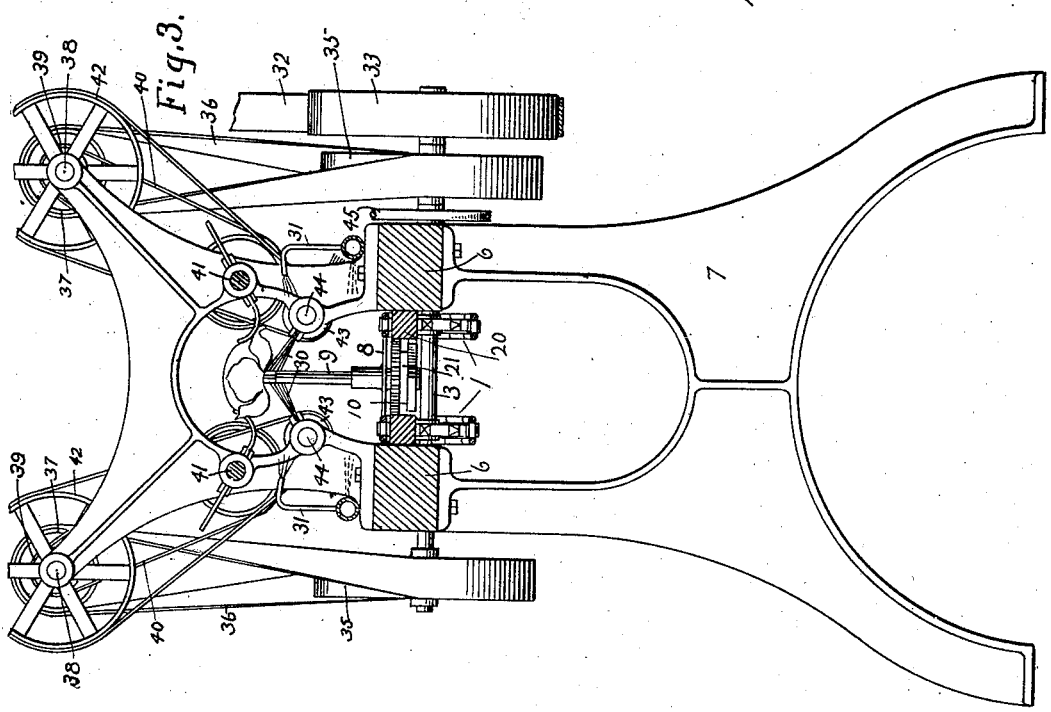
WITNESSES
INVENTOR

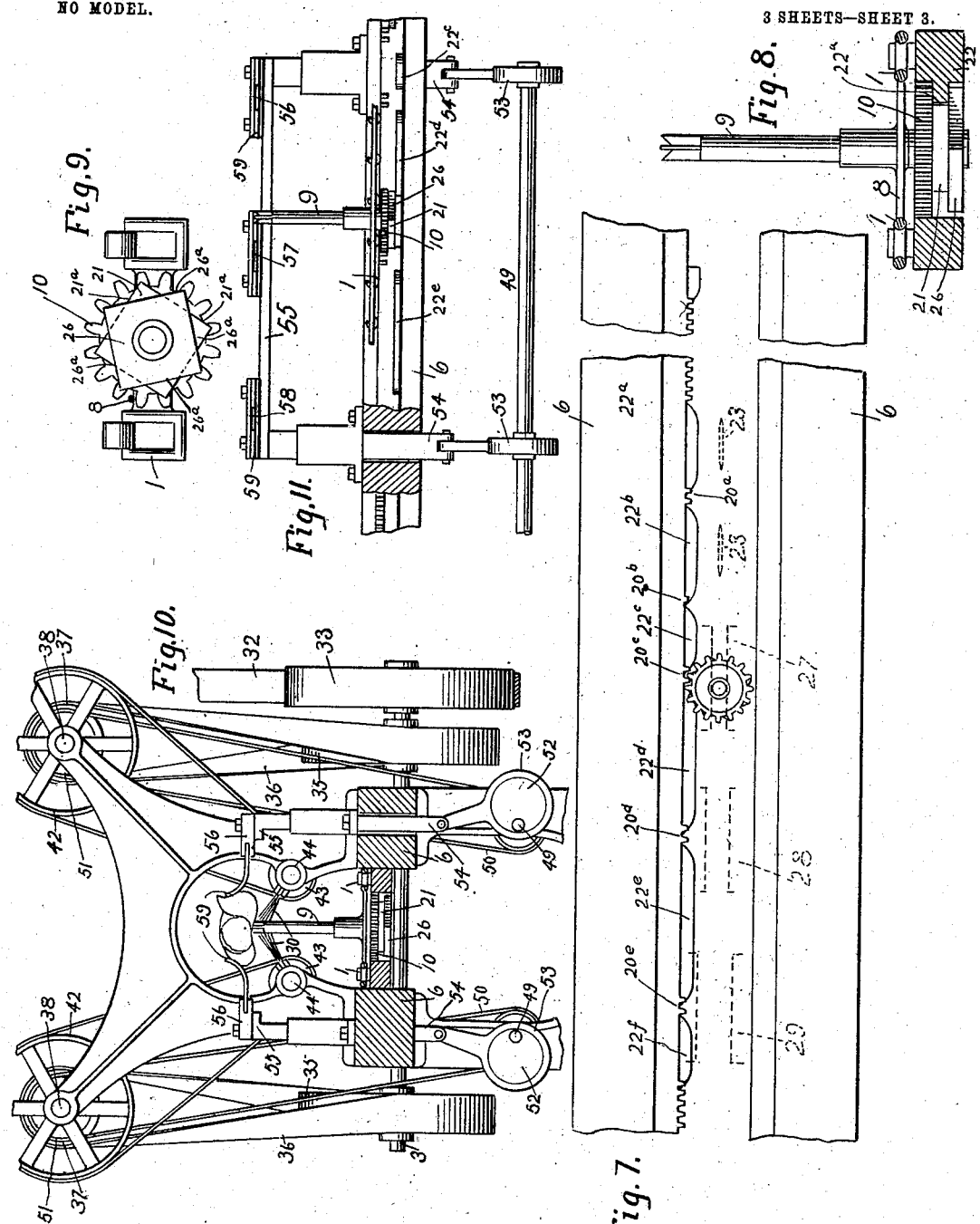

No. 746,530. Patented December 8, 1903.

UNITED STATES PATENT OFFICE.

WILLIAM J. LATCHFORD, OF VANWERT, OHIO, ASSIGNOR OF TWO-THIRDS TO ROYAL PACKING COMPANY, OF CHICAGO, ILLINOIS, A CORPORATION OF ILLINOIS.

MACHINE FOR PREPARING FRUIT FOR CANNING.

SPECIFICATION forming part of Letters Patent No. 746,530, dated December 8, 1903.

Application filed January 20, 1903. Serial No. 139,735. (No model.)

*To all whom it may concern:*

Be it known that I, WILLIAM J. LATCHFORD, a citizen of the United States, residing at Vanwert, in the county of Van Wert and State of Ohio, have invented new and useful Improvements in Machines for Preparing Fruit for Canning, of which the following is a specification, reference being had to the accompanying drawings, forming a part thereof.

The purpose of this invention is to provide an improved apparatus for handling fruit, particularly tomatoes, through the steps preparatory to canning, performing automatically the process of removing the skin.

It consists in the features of construction set out in the claims.

In the drawings, Figure 1 is a plan of my machine for the purpose stated. Fig. 2 is a section at the line 2 2 on Fig. 1. Fig. 3 is a section at the line 3 3 on Fig. 2. Fig. 4 is a detail section at the line 4 4 on Fig. 2. Fig. 5 is a detail rear elevation of the means for communicating motion to the several shafts. Fig. 6 is a detail of the cutter for removing the cores. Fig. 7 is a detail plan of the mechanism for controlling the rotation of the gear-pinion and spindle. Fig. 8 is a detail, section being made through the frame in a vertical plane transverse to the direction of travel of the carrier. Fig. 9 is an inverted detail plan of the links and cross-bars of the endless carrier and the polygonal collar and the delay-surfaces thereon and of the gear-wheel secured on the spindle. Fig. 10 is a sectional view similar to that shown in Fig. 3, showing a modification of the device for disengaging the skin. Fig. 11 is a detail of the device for disengaging the skin shown in Fig. 10, with a portion of the side bar broken away to show the passage therethrough of one of the guide-arms of the reciprocating carrier.

My improved machine for the purpose stated comprises an endless carrier on which are carried spindles adapted to have the fruit to be treated secured upon them and a succession of devices operating upon the fruit as it is carried through the machine by such carrier. First, a succession of water-jets are arranged to act upon the fruit for cleansing it; second, a succession of steam-jets are arranged to discharge steam onto the fruit for the purpose of loosening the skin. The third element comprises cutters which divide the skin by sectoral cuts at the side opposite the stem or core end, so that it may be peeled off readily in sections. The fourth element consists of a group or system of wipers which detach the skin in sectoral portions according to the cuts which have been made through it, as described, peeling it back from the top down to the base or most adherent point. The fifth element is a system of brushes which attack the skin about the base, completing the separation of the skin from the flesh of the fruit. After passing through these processes the skin being entirely detached from the fruit is stripped or falls off the spindles as the conveyer on which the spindles are mounted passes around the driving-wheels at the delivery end, and the fruit thus stripped off is received in any convenient receptacle or conveyer for taking it through the remaining steps of the process.

In detail the mechanism above outlined comprises an endless carrier consisting of two parallel endless chains 1 1, driven by spocket-wheels 2 2 on the actuating-shaft 3 and traveling around idle-wheels 4 4 on the shaft 5 at the opposite end of the supporting frame or bed, comprising the side bars 6 6 and posts 7 7 7, &c. The two carrying-chains 1 1 are connected at intervals by cross-bars 8 8, &c., and on each of the cross-bars there is mounted a spindle 9, projecting upward with sufficient rigidity to carry the fruit, as hereinafter described. These spindles have each rigid with them a gear 10 on the under side of the cross-bar, the spindles being journaled in said cross-bar and the gear being present for the purpose of rotating the spindles in certain of the processes, as hereinafter described. The fruit to be prepared is first cleared of the core or hard portion at the base by suitable tool—as, for example, the cutter 11—which is a hollow cone rifted at one side to form the cutting edge 12, such edge being deflected slightly outward, while the other edge 13 is deflected inward or chamfered off the outer surface, so that as the cone rotates it will cut out from the fruit at the base or stem end a conical section commonly called the "core," each piece of fruit being forced onto the conical cutter at that point by the operator. The fruit thus deprived of the cores is forced onto the upper end of one of the spindles as it passes by the operator who stands alongside the machine at the right-hand end, and the speed of the carrier is designed to be such that the operator can be kept busy applying the fruit to the spindles as they pass. A series of nozzles 14 14, &c., connected with a water-supply pipe 15, are arranged to discharge water from both sides and from above and below onto the fruit as it is carried through the machine, thus cleansing it exteriorly before it is exposed to any other action. A steam-pipe 16 is provided with four horizontal branches 17 17 and 18 18, two discharging from below and two from above, one from the forward and one from the rear side of the path of the fruit where it is carried on the spindle, so that every part of the fruit is exposed to the steam as it passes along between the pipes. In addition to these four pipes two pipes 19 19 are located very close to the path of the spindle on either side (see Fig. 4) and discharge the steam at shorter range close around the base, where the skin is more strongly adherent to the flesh, the purpose being to uniformly loosen the skin over the whole surface. The spindles carrying the fruit are kept revolving while the fruit is passing the water and steam jets, this being effected by the gear-pinion 10 engaging the rack 20, mounted on the inner side of the rear frame-bar. The rack-teeth are intermitted at the point reached by the pinion when the fruit has passed the last steam-jet, and a polygonal collar 21, rigid with the pinion 10, coöperates with a delay-track 22, parallel with the rack 20, to arrest and hold the spindle stationary while it is carried past the next element, consisting of the cutters 23 23, which are sharpened disks mounted on shafts 24 24, which extend transversely with respect to the path of the carrier and are revolved by a belt over pulleys 25 25 at the rear ends of the shafts, respectively. As the fruit passes the first cutter the skin is slit across the top diametrically with respect to the fruit, and after passing this cutter the delay-surface $21^a$ on the polygonal collar 21 passes off the corresponding delay-seat $22^a$ of the delay-track 22 and the gear 10 comes into mesh with the teeth $20^a$ on the rack 20, and the spindle is thereby given a quarter-turn and brought to rest by the second delay-surface $21^a$ meeting a corresponding delay-surface $22^b$ on the delay-track 22, and by the coöperation of these delay-surfaces the spindle is held stationary while the fruit encounters the second cutter 23, and its skin receives a second slit at right angles to the first, quartering it at the upper side of the fruit. By the time the fruit has passed this cutter the polygonal collar 21 runs clear of the delay-track 22, the pinion 10 engages the tooth $20^b$ on the rack and receives a turn of forty-five degrees, and a second polygonal collar 26 on the gear 10 comes into coöperation with a third delay-surface $22^c$ alongside the rack 20, and one of the delay-surfaces $26^a$ on said collar 26 forty-five degrees around from the last-mentioned delay-surface $21^a$ brings the spindles to rest, with the angles of the sectoral quarters of the skin pointing, respectively, longitudinally and transversely with respect to the direction of travel. Here the fruit is in range of action of the wipers 27, 28, and 29. These wipers in the form shown in the principal figures consist of flexible blades or flaps, preferably of rubber, projecting from hubs mounted on shafts 41 41, one at each side of the path of the fruit, revolving transversely to the direction of travel of the spindles. These wipers are arranged in pairs, one of each pair being at each side of the path of the fruit. The blades of the first pair of wipers 27 are longer than those of the succeeding pair of wipers 28, and these in turn are longer than those of the last pair 29, the longer wipers being designed to attack the skin near the center at the angles of the sectoral flaps of skin, so as to engage them at the best advantage for peeling them back and exposing them to the action of the second wipers, which carry forward the process, and these in turn exposing the skin flaps to the best action of the third shorter wipers, which continue the stripping action until the skin hangs by engagement only at the base of the fruit or in some instances may be entirely peeled off. These wipers are sufficiently flexible to operate upon the fruit substantially as shown in Fig. 3—that is, they bend as they encounter the fruit—yielding to the form of the latter and following that form, and so are dragged along the surface and draw the skin back as described. After passing the first half of the width of the first pair of wipers 27 the spindle receives a turn of ninety degrees in order to expose to the action of the second half of the width of the first pair of these wipers the two sectors of the skin which would not be exposed to the action at first position, this ninety-degree turn being effected by engagement of the gear-pinion 10 with teeth $20^c$ on the rack, the delay-surface $26^a$ having cleared the coöperating delay-surface $22^c$ in time to permit such change and the second delay-surface $26^a$ on the same collar coming into engagement with the corresponding delay-surface $22^d$ to hold the fruit stationary while it passes the second half of the width of the longer wipers. When the fruit has cleared this first pair of longer wipers, it comes into the range of action of the second pair 28, and the two sectors of skin which were last exposed to the action of the longer wipers are now exposed to the action of the first half of the width of the intermediate wipers 28, and passing said first half the spindle receives a quarter-turn by the engagement of the pinion with the gear-teeth 20$^d$, the last engaged delay-surface 26$^a$ having cleared the corresponding delay-surface of the track 22 to permit this quarter-turn, and the next following delay-surface 26$^a$ comes into delay relation with the next delay-surface 22$^e$ on the track to hold the fruit stationary while the second half of the width of the second pair of wipers 28 acts upon it. Passing this second pair while held non-rotating by the continued coöperation of the delay-surfaces 26$^a$ and 22$^e$, the fruit is brought into range of action of the first half of the width of the shortest wipers, and passing said first half receives a quarter-turn by engagement of the pinion with the gear-teeth 20$^e$ and is held stationary by coöperation of the next delay-surface 26$^a$ with the corresponding delay-surface 22$^b$, while the second half of the width of shortest wipers acts upon the other two sectors of skin.

Having passed all the wipers, the gear-pinion comes into engagement again with the continuous portion of the rack 20, and the fruit is kept revolving while it is carried past the buffing-brushes 30 30, which are revolved at comparatively high speed and attack the skin at the base of the fruit to complete the stripping process. All the wipers and the brushes are continually exposed to flushing-jets of water from the nozzles 31 31, which thus keep them clear of the skin, which might otherwise become lodged on or adhesive to them, and the fruit is also within the range of the jets and is kept flushed clean, so that when it is carried beyond the brushes it is ready for delivery, and now passing down around the axis of the driving-wheel at the end of the carrier it falls into a receptacle 32 at the under side.

For driving the wipers, brushes, and cutters described and actuating the carrier power is communicated, as by a belt 32, over pulley 33 to the shaft 3, which carries the sprocket-wheels 2 2 for actuating the carrier described, and on this shaft are mounted two pulleys 35 35, which by belts 36 36, having each a quarter-twist in opposite directions, drive the pulleys 37 37 on the shafts 38 38, which extend longitudinally along the front and rear of the machine. On these shafts 38 are small pulleys 39 39, which by belts 40 40 rotate at properly slow speed the shafts 41 41, on which are mounted the wipers 27, 28, and 29, above described. On the same shafts 38 are large pulleys 42 42, which are belted to the small pulleys 43 43 on the shafts 44 44, which carry the buffing-brushes 30. On the shaft 3 there is a pulley 45, from which a belt 46 passes around the first pulley 25 on the cutter-shaft, and from a second pulley 25$^a$ on the same shaft a belt 47 extends to the pulley 25 of the other cutter-shaft, whereby both are driven at the same speed.

A modification of the wipers is shown in Fig. 10. It consists in carrying these wipers on vertically-reciprocating stems instead of upon rotating devices. In this construction shafts 49 49 are journaled on the frame of the machine below the carrier and driven by direct belts 50 50 from pulleys 51 51 on the shaft 38, corresponding to the pulleys 37 37 in the other construction. On each of these shafts there are mounted two eccentrics 52 52, and from their straps 53 53 connections are made to two downwardly-extending guide-arms 54 54 of a reciprocating carrier, on whose cross-bar 55 there is mounted the wiper-stocks 56, 57, and 58, each of which has two wipers 59, of similar flexible material to those pertaining to the revolving wipers above described. The wipers are in pairs, as described, for the same purpose as a similar arrangement I adopted in the revolving wipers—that is, so that each piece of fruit may be exposed to the action of the wipers of each length on all four quarters of the quartered skin.

In practice it commonly happens that the longest wipers complete the process of stripping back the skin to the base of the fruit, leaving nothing for the subsequent shorter wipers to do; but their presence is nevertheless desirable, because it frequently happens that the skin is strongly adherent at the less-ripened spots of the fruit below the top and at different positions in different pieces of the fruit, and the most effective action of the wiper in detaching the skin is performed when its end strikes the fruit, and a piece of skin which will not be detached by the drag of the longer wiper over the adherent spot after the wiper is flexed and presses upon the fruit only by its convex flexed surface and not at the end will be completely detached upon being struck by the end of the shorter wiper before any material flexure has occurred. This applies equally to the rotating wipers and to the reciprocating device last described.

I claim—

1. An apparatus for the purpose indicated, comprising a carrier having means at intervals for holding the fruit; means for steaming the fruit to loosen the skin, located along the path of the fruit as it is advanced by the carrier, and means also located along said path beyond the steaming devices for mechanically detaching the skin.

2. An apparatus for the purpose described, comprising a carrier having devices at intervals for holding the fruit; steaming devices located along the path of the fruit as it is advanced by the carrier, to loosen the skin; cutters for slitting the skin as the fruit is carried past them; wipers for engaging and stripping back the severed sections of the skin, and means beyond the wipers for detaching the skin at the base of the fruit.

3. An apparatus for the purpose indicated above, comprising a carrier having devices at intervals for holding the fruit; steaming devices located along the path of the fruit as it is advanced by the carrier, for loosening the skin; cutters also located along said path beyond the steaming devices for slitting the skin into sections; wipers located beyond the cutters for engaging and stripping back the severed sections of the skin, and buffing-brushes located beyond the wipers, for detaching the skin at the base of the fruit.

4. An apparatus for the purpose indicated, comprising a carrier having spindles at intervals for holding the fruit; means for rotating the spindles as the carrier travels; steaming devices located along the path of the fruit for loosening the skin, and means beyond the steaming devices for mechanically detaching the loosened skin.

5. An apparatus for the purpose indicated, comprising a carrier having, at intervals, spindles for holding the fruit; steaming devices located along the path of the fruit as it is advanced by the carrier for loosening the skin, pinions on the spindles, respectively, and a rack fixed along the path of the carrier for engaging the pinions to rotate the spindles as the carrier travels, the rack-teeth being intermitted at points to permit the spindles to rest in their rotation while the fruit passes the cutter, and means for engaging the severed sections of the skin beyond the cutter to strip them from the fruit.

6. An apparatus for the purpose indicated, comprising an endless carrier; spindles mounted at intervals thereon for carrying the fruit; pinions on the spindles and a rack fixed along the path of the carrier for engaging the pinions to rotate the latter and the fruit as the carrier moves; steaming devices located along the path of the fruit as it is advanced by the carrier and rotated, for loosening the skin; buffing-brushes located along the path of the fruit beyond the steaming devices, and means for rotating them in contact with the fruit as it passes them to detach the loosened skin.

7. An apparatus for the purpose indicated, comprising a carrier having spindles at intervals for holding the fruit; means for rotating the spindles as the carrier travels; steaming devices located along the path of the fruit as it is advanced by the carrier for loosening the skin; cutters located beyond the steaming devices for slitting the skin; buffing-brushes located beyond the cutters, and means for rotating them in contact with the fruit as it passes to detach the severed sections of the loosened skin.

8. In an apparatus for the purpose indicated, comprising a carrier having spindles at intervals for holding the fruit; a plurality of cutters located successively along the path of the fruit as it is carried by the spindles for slitting the skin; a plurality of wipers located successively beyond the cutters for engaging the severed sections to strip them from the fruit; pinions on the spindles with delay-surfaces and a mutilated rack and delay-surfaces along the path of the carrier to engage the pinions and coöperate with the delay-surfaces thereof for holding the fruit non-rotating when it passes each cutter, and for turning it between the cutters and for turning it beyond the cutters into position for presenting the severed sections of skin to the wipers, and for holding it non-rotating while passing each wiper, and for turning it between the wipers.

9. In an apparatus for the purpose indicated, in combination with the means for carrying the fruit and means for loosening and slitting the skin, a plurality of wipers and means for actuating them to cause them to engage the skin, said wipers comprising flexible blades or flaps, such wipers having successively shorter and shorter blades or flaps to attack the fruit at different distances from the axis.

10. In an apparatus for the purpose stated, in combination with the means for carrying the fruit and means for loosening and slitting the skin, wipers for engaging the skin to detach it from the fruit, comprising frames or holders reciprocating transversely with respect to the path of travel of the fruit, and flexible flaps or wings carried by such frames against the fruit as the frames reciprocate.

11. In an apparatus for the purpose indicated, in combination with a carrier for the fruit, means for loosening and means for subdividing the skin, the wiper-frames extending horizontally on opposite sides of the path of the fruit, and having their flexible flaps or blades projecting toward each other across the path of the fruit; shafts parallel with the direction of travel at the sides thereof, and eccentrics on said shafts for operating the wiper-frames to give them reciprocating movement while the fruit passes the flaps.

12. An apparatus for the purpose indicated, in combination with a carrier having at intervals devices for holding the fruit; steaming devices located along the path of the carrier for loosening the skin and buffing-brushes located along said path beyond the steaming devices for detaching the skin.

13. An apparatus for the purpose indicated comprising in combination with the carrier having spindles at intervals for holding the fruit, means for rotating the spindles to rotate the fruit thereon, steaming devices located along the path of the fruit as it is advanced by the carrier for loosening the skin, and rotating brushes beyond the steaming devices for operating on the fruit to mechanically detach the skin as the fruit rotates and advances.

14. An apparatus for the purpose indicated, comprising, in combination with the carrier having devices at intervals for holding the fruit, steaming devices located along the path of travel of the fruit for loosening the skin; cutters located beyond the steaming devices for slitting the skin into sections, and wipers beyond the cutters for engaging and stripping off the severed sections of the skin.

15. An apparatus for the purpose indicated, comprising, in combination with the carrier having spindles at intervals for holding the fruit and means for rotating the spindles as the carrier travels, cutters located in the path of the fruit as it is advanced by the carrier while so held and rotated for slitting the skin radially as the fruit passes and wipers located beyond the cutters for engaging and stripping back the severed sections of the skin.

16. An apparatus for the purpose indicated, comprising, in combination with the carrier having spindles at intervals for holding the fruit, means for rotating the spindles as the carrier travels; steaming devices located along the path of the fruit for loosening the skin; cutters located beyond the steaming devices for slitting the skin into sections and wipers located beyond the cutters for engaging and stripping back the severed sections of the skin.

17. An apparatus for the purpose indicated, comprising, in combination with the carrier having spindles at intervals for holding the fruit, means for rotating the spindles as the carrier travels; steaming devices located along the path of the fruit for loosening the skin; cutters located beyond the steaming devices for slitting the skin into sections; means for rotating the spindles during their passage from one cutter to another, and wipers located beyond the cutters for engaging and stripping back the severed sections of the skin.

In testimony whereof I have hereunto set my hand, in the presence of two witnesses, at Chicago, Illinois, this 12th day of January, A. D. 1903.

WILLIAM J. LATCHFORD.

In presence of—
WILLIAM L. GAHAN,
MICHAEL J. DOHERTY.